US012747330B2

(12) United States Patent
Xu et al.

(10) Patent No.: US 12,747,330 B2
(45) Date of Patent: Sep. 29, 2026

(54) FOAMABLE SILICONE COMPOSITION

(71) Applicant: Wacker Chemie AG, Munich (DE)

(72) Inventors: Yuanyuan Xu, Shanghai (CN); Anxiang Gao, Shanghai (CN)

(73) Assignee: Wacker Chemie AG, Munich (DE)

(*) Notice: Subject to any disclaimer, the term of this patent is extended or adjusted under 35 U.S.C. 154(b) by 700 days.

(21) Appl. No.: 18/013,796

(22) PCT Filed: Jul. 2, 2020

(86) PCT No.: PCT/CN2020/099907
§ 371 (c)(1),
(2) Date: Dec. 29, 2022

(87) PCT Pub. No.: WO2022/000413
PCT Pub. Date: Jan. 6, 2022

(65) Prior Publication Data
US 2023/0287193 A1 Sep. 14, 2023

(51) Int. Cl.
*C08G 77/12* (2006.01)
*C08G 77/16* (2006.01)
*C08G 77/20* (2006.01)
*C08J 9/00* (2006.01)
*C08J 9/02* (2006.01)
*C08J 9/12* (2006.01)
*C08K 3/10* (2018.01)

(52) U.S. Cl.
CPC ........... *C08J 9/0061* (2013.01); *C08J 9/0033* (2013.01); *C08J 9/0042* (2013.01); *C08J 9/0052* (2013.01); *C08J 2383/07* (2013.01); *C08J 2483/05* (2013.01)

(58) Field of Classification Search
None
See application file for complete search history.

(56) References Cited

U.S. PATENT DOCUMENTS 4,631,299 A 12/1986 Laisney et al.
4,871,782 A * 10/1989 Modic ........................ C08J 9/02 521/154
5,744,508 A 4/1998 Yaginuma et al.
6,022,904 A 2/2000 Sollradl et al.
2004/0122119 A1 * 6/2004 Burgess ................. C08J 9/0066 521/155
2005/0154132 A1 7/2005 Hakuta et al.
2013/0164567 A1 * 6/2013 Olsson ................ H01M 10/425 429/93
2014/0024731 A1 1/2014 Blanc et al.
2018/0223069 A1 8/2018 O'Neil et al.
2018/0312653 A1 * 11/2018 Katano ................ C08G 65/336
2021/0317281 A1 10/2021 Broderick et al.

FOREIGN PATENT DOCUMENTS

| | | | |
|---|---|---|---|
| CN | 1182187 | C | 12/2004 |
| CN | 1660928 | A | 8/2005 |
| CN | 101845224 | B | 11/2011 |
| CN | 109161205 | A | 1/2019 |
| CN | 109796622 | A | 5/2019 |
| CN | 106589954 | B | 4/2020 |
| CN | 110862693 | B | 2/2022 |
| EP | 0661337 | A1 | 7/1995 |
| JP | H07196832 | A | 8/1995 |
| JP | 2002187971 | A | 7/2002 |
| JP | 2020506995 | A | 3/2020 |
| TW | 202007730 | A | 2/2020 |

* cited by examiner

*Primary Examiner* — Melissa A Rioja
(74) *Attorney, Agent, or Firm* — Brooks Kushman P.C.

(57) ABSTRACT

Foamable silicone compositions, containing (A) at least one organopolysiloxane containing at least two alkenyl groups bonded to silicon per molecule, (B) at least one organopolysiloxane containing at least two hydrogen atoms bonded to silicon per molecule, (C) at least one porogenic agent generating gaseous hydrogen in the presence of component (B), and (D) at least one hydrosilylation catalyst. Foams obtained by curing such foamable silicone compositions have excellent resilience, moderate hardness, good mechanical properties, and flame retardancy, suitable for the sealing of battery pack cases.

20 Claims, No Drawings

FOAMABLE SILICONE COMPOSITION

CROSS REFERENCE TO RELATED APPLICATIONS

This application is the U.S. National Phase of PCT Application No. PCT/CN2020/099907 filed Jul. 2, 2020, the disclosure of which is incorporated in its entirety by reference herein.

BACKGROUND OF THE INVENTION

1. Field of the Invention

The present disclosure relates to foamable silicone compositions.

2. Description of the Related Art

As a power source for electric vehicles, stable, safe and reliable battery packs are critical to the quality of vehicles. And consequently, higher requirements are placed on the performances of materials for sealing battery pack cases, such as hardness, resilience and mechanical properties.

Foamable silicone materials, particularly auto-dispensing foamable silicone compositions which are dispensed via an automatic dispenser and then cured into foam at room temperature or a high temperature followed by compression to achieve sealing, are new solutions for sealing battery pack cases. If the silicone foam has a too high hardness, compression will become difficult and the upper cover of the battery pack is likely to deform, leading to a sealing failure. If the foam has poor resilience, rebound force generated under pressure will be insufficient, which is likely to cause leakage due to deformation or displacement of the battery pack. Therefore, the resilience and hardness of the silicone foam are critical to ensure the safety.

CN1182187C discloses a silicone foam with a density of 0.29-0.35 g/cm$^3$, and also discloses that the foam resilience can be improved by adding an organic sulfur compound such as 3-mercaptopropyltrimethoxysilane. However, compression set (CS) (50%, 24 hours, 100° C.) of the foam is still greater than 20%, which is not conducive to a good sealing performance. Besides mechanical properties of the foam are also poor, and not an ideal material for sealing battery pack cases.

CN110862693A discloses a silicone sponge with a density of 0.17-0.22 g/cm$^3$ by using n-butanol as a porogenic agent. The CS (50%, 22 hours, 70° C.) of the sponge is less than 3%, however, it is not a suitable material for sealing battery pack case due to its ultra-low density, which sacrifices mechanical properties.

Moreover, further requirements on the flame retardancy of sealing materials exist due to the safety issue of battery packs. It has been reported that the addition of flame retardants can impart flame retardancy to foamable silicone materials. However, this is considered to be detrimental to e.g. resilience and hardness of foamable materials since the flame retardancy of V-0 grade is achieved usually with a high amount of flame retardants, which seriously affects the homogeneity of the material.

CN106589954A discloses in Example 1 that adding 26 wt % of flame retardant comprising modified aluminum hydroxide and expandable graphite to foamable silicone rubber can achieve V-0 flame retardancy. However, such foamed silicone rubber has poor resilience performance and mechanical properties and cannot be used as a sealing material for battery pack cases.

CN101845224B discloses in Example 4 that adding 22 wt % of flame retardant comprising aluminum hydroxide, expandable graphite, ammonium polyphosphate and pentaerythritol to silicone foam can achieve V-0 flame retardancy. However, the resilience performance and mechanical properties of the silicone foam are also unsatisfactory.

SUMMARY OF THE INVENTION

The foregoing deficiencies are solved by the use of a foamable silicon composition containing an alkenyl-functional organopolysiloxane, an Si—H functional organopolysiloxane, a hydroxy-containing porogenic, and a hydrosilyation catalyst where the molar ratio of Si—H groups to silicon alkenyl groups is form 5:1 to 15:1, and the molar ratio of Si—H groups to hydroxy groups is from 2:1 to 20:1.

DETAILED DISCLOSURE OF THE PREFERRED EMBODIMENTS

The present disclosure provides a foamable silicone composition which balances two competing reactions, i.e. curing reactions between Si—H and alkenyl groups and foaming reactions between Si—H and hydroxyl groups, by the combination of specific molar ratios of Si—H to alkenyl and Si—H to hydroxyl. When the foaming reaction is too fast, the cured network is insufficient to support the cell structure, causing collapse of cells which affects the product performance. When the foaming reaction is too low, the cured network is too strong, making the product difficult to expand. However, the foamable silicone composition of the present disclosure overcomes such conventional defects and achieves at least one of the following goals with a good cell structure obtained.

1) Excellent resilience performance under aging conditions, CS (50%, 22 hours, 110° C.), $CS_{D85}$ (50%, 42 d) and $CS_{shock}$ (50%, 42 days) all below 10%, very suitable for the sealing of battery pack cases with high sealing levels.
2) Moderate foam hardness, consideration given to the sealing performance and foam mechanical properties.
3) Excellent flame retardancy of V-0 grade at a low amount of flame retardants, without affecting the homogeneity of the foam.

Herein, term "foamable silicone material" refers to materials, based on organopolysiloxane, able to react to form porous structures in the presence of porogenic agent, crosslinker, catalyst and other additives. The materials with porous structures includes foams or sponges, but not limited thereto.

Herein, "sieve particle size" is determined by sieving granulometry, in μm.

The first aspect of the present disclosure provides a foamable silicone composition, comprising:

(A) at least one organopolysiloxane containing at least two alkenyl groups bonded to silicon per molecule, (B) at least one organopolysiloxane containing at least two hydrogen atoms bonded to silicon per molecule, (C) at least one porogenic agent generating gaseous hydrogen in the presence of Component (B), (D) at least one hydrosilylation catalyst, and (E) optionally at least one inhibitor, and (F) optionally at least one reinforcing filler;

wherein the molar ratio of SiH groups from Component (B) to silicon-bonded alkenyl groups from Component (A) is from 5:1 to 15:1, and the molar ratio of SiH groups from Component (B) to hydroxy groups from Component (C) is from 2:1 to 20:1.

Component (A)

The organopolysiloxane (A) is typically of following formula:

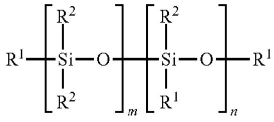

wherein $R^1$ is independently at each occurrence an alkenyl group having from 2 to 6 carbon atoms, for example vinyl, allyl, propenyl, butenyl, hexenyl, hexadienyl, cyclopentenyl, cyclopentadienyl, cyclohexenyl, preferably vinyl, allyl and propenyl, more preferably vinyl.

$R^2$ is independently at each occurrence a substituted or unsubstituted monovalent organic group having from 1 to 20 preferably 1 to 10 carbon atoms, for example, alkyl such as methyl, ethyl, propyl, butyl, pentyl, hexyl, octyl, aryl or alkaryl such as phenyl, tolyl, xylyl, mesityl, ethylphenyl, benzyl, naphthyl, and halogenated or organic-group-functionalized derivatives of the above groups such as 3,3,3-trifluoropropyl, o-, p- and m-chlorophenyl, aminopropyl, 3-isocyanatopropyl, cyanoethyl, preferably methyl and phenyl, more preferably methyl.

m is a positive number, n is zero or a positive number, and m+n is such that the organopolysiloxane (A) has a dynamic viscosity at 25° C. of from 1.00 to 100,000 mPa·s, for example from 1,000 to 80,000 mPa·s, from 5,000 to 50,000 mPa·s.

Organopolysiloxane (A) of the following formula is particularly preferred:

$$Vi(Me_2SiO)_m(ViMeSiO)_nVi$$

wherein Vi is vinyl, Me is methyl, m is a positive number, n is zero or a positive number, and m+n is such that the organopolysiloxane has a dynamic viscosity of from 5,000 to 50,000 mPa·s at 25° C.

Component (A) of the present disclosure may be a single alkenyl group-containing organopolysiloxane, or may be a mixture of different alkenyl group-containing organopolysiloxanes which differ in molecular structure (for example type and number of substituents), vinyl content or viscosity. For a mixture of organopolysiloxanes, m and n represent average values, and the viscosity range met by m+n is relative to the viscosity of the mixture.

In order to increase crosslinking sites and crosslinking density, and improve the resilience performance and mechanical properties of the cured foam, Component (A) of the present disclosure may also contain a small amount of alkenyl group-containing organopolysiloxane with a low viscosity. In an embodiment herein, Component (A) comprises (A1) a first organopolysiloxane containing at least two alkenyl groups bonded to silicon per molecule with a dynamic viscosity at 25° C. of from 1,000 to 100,000 mPa·s, for example from 5,000 to 50,000 mPa·s, and (A2) a second organopolysiloxane containing at least two alkenyl groups bonded to silicon per molecule with a dynamic viscosity at 25° C. of from 10 to 1,000 mPa·s, for example from 50 to 500 mPa·s. In a more specific embodiment herein, Component (A) comprises (A1) a first organopolysiloxane containing at least two alkenyl groups bonded to silicon per molecule with a dynamic viscosity of from 10,000 to 30,000 mPa·s at 25° C., and (A2) a second organopolysiloxane containing at least two alkenyl groups bonded to silicon per molecule with a dynamic viscosity of from 100 to 300 mPa·s at 25° C. According to any of the above embodiments, organopolysiloxane (A2) is used in an amount of from 0.2 wt % to 10 wt %, for example from 1 wt % to 5 wt %, based on the total weight of Component (A).

In the present disclosure, Component (A) is suitably used in an amount of from 35 wt % to 95 wt %, for example from 50 wt % to 90 wt %, based on the total weight of the composition.

Component (B)

Component (B) acts as a crosslinker in the composition. Generally Component (B) has a hydrogen content of from 0.01 wt % to 1.7 wt %, preferably from 1.2 wt % to 1.7 wt %. The position of Si—H groups is not particularly limited, and they can be present only as side groups, or as both side and end groups.

Organopolysiloxane (B) may be linear, cyclic, branched or resinous. Linear or cyclic organopolysiloxane (B) is typically composed of units selected from $R^2_3SiO_{1/2}$, $HR^2SiO_{2/2}$, $HR^2_2SiO_{1/2}$ and $R^2_2SiO_{2/2}$ wherein $R^2$ is as defined above, preferably methyl and phenyl, more preferably methyl. Branched or resinous organopolysiloxane (B) further comprises trifunctional units such as $HSiO_{3/2}$ and $R^2SiO_{3/2}$, and/or tetrafunctional units such as $SiO_{4/2}$. Linear or cyclic organopolysiloxane (B) composed of units selected from $Me_3SiO_{1/2}$, $HMeSiO_{2/2}$, $HMe_2SiO_{1/2}$ and $Me_2SiO_{2/2}$ is particularly preferred.

In order to obtain a foam with high resilience, moderate hardness and good mechanical properties, the molar ratio of SiH groups from Component (B) to silicon-bonded alkenyl groups from Component (A) of the present disclosure is preferably from 5:1 to 12:1, particularly from 7:1 to 12:1.

Component (C)

Component (C) acts as a porogenic agent in the composition, which reacts with Si—H groups in Component (B) generating gaseous hydrogen to influence foaming behavior but does not contribute to crosslinking. Commonly used porogenic agents are at least one hydroxyl-group-containing compound including organopolysiloxane (C1) containing at least one hydroxyl group, alkanol and water.

The organopolysiloxane (C1) is typically of following formula:

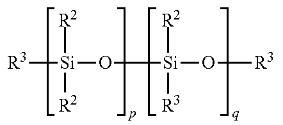

wherein $R^2$ is as defined above, preferably methyl and phenyl, more preferably methyl.

$R^3$ is independently at each occurrence a hydroxyl group or $R^2$, and it suffices that at least one $R^3$ is a hydroxyl group, preferably both $R^3$ bonded to the end silicon atom of the polymer are hydroxyl groups.

p is a positive number, q is zero or a positive number, and p+q is such that the organopolysiloxane (C1) has a dynamic viscosity at 25° C. of from 10 to 10,000 mPa·s, for example from 50 to 5,000 mPa·s, especially from 50 to 1,000 mPa·s.

Organopolysiloxane (C1) of the following formula is particularly preferred:

$$HO(Me_2SiO)_p(HOMeSiO)_qOH$$

wherein Me is methyl, p is a positive number, q is zero or a positive number, and p+q is such that the organopolysiloxane has a dynamic viscosity of from 50 to 1,000 mPa·s at 25° C.

In a preferred embodiment herein, Component (C) is free of organopolysiloxane (C1). Herein "free of" refers to the content of a certain ingredient in the component is less than 1 wt %, less than 0.5 wt %, less than 0.1 wt %, or less than 0.05 wt %.

The alkanol may be an organic alcohol containing at least one hydroxyl group, but is not an alcohol acting as a hydrosilylation inhibitor for example alkynol, including monohydric alcohols with 1-12 carbon atoms such as ethanol, n-propanol, isopropanol, n-butanol, n-hexanol, n-octanol, cyclopentanol, cyclohexanol, or cycloheptanol, and polyols with 2-12 carbon atoms such as ethylene glycol, propylene glycol, glycerin, butylene glycol, pentanol glycol, or heptane. In a preferred embodiment herein, Component (C) is free of alkanol.

When water is used as a porogenic agent, it may be introduced in the form of an aqueous emulsion, such as an aqueous silicone emulsion including an oil-in-water silicone emulsion or a water-in-oil silicone reverse emulsion, to promote the dispersion of water in the composition. The aqueous silicone emulsion contains a polysiloxane oil phase, a water phase and an emulsifier. The emulsifier may be a nonionic emulsifier, an anionic surfactant, a cationic surfactant or a zwitterionic surfactant, preferably a nonionic surfactant. The aqueous silicone emulsion can be obtained by an emulsification process well known to those skilled in the art. The viscosity of the aqueous silicone emulsion is not particularly limited. In a preferred embodiment herein, Component (C) is an aqueous emulsion of polysiloxane with a dynamic viscosity of from 1,000 to 30,000 mPa·s at 25° C.

In order to obtain a foam with moderate density and hardness, good resilience and mechanical properties, the molar ratio of SiH groups from Component (B) to hydroxy groups from Component (C) of the present disclosure is from 3.5:1 to 12.5:1.

Component (D)

Component (D) can be a variety of hydrosilylation catalysts conventionally used for addition-crosslinking silicone rubbers, preferably a platinum-based catalyst, for example chloroplatinic acid, chloroplatinates, olefin complexes of platinum, and alkenylsiloxane complexes of platinum. The platinum-based catalyst can be used in an amount subject to the desired curing rate and economic consideration, which is usually a minimum level required to ensure an effective hydrosilylation reaction. Generally, the weight of platinum metal in the foamable silicone composition is from 0.1 to 500 ppm, for example from 1 to 100 ppm.

Component (E)

The foamable silicone composition can further comprise inhibitor (E) to control the pot life and curing rate of the composition. The inhibitor can be a variety of inhibitors used in the art, for example alkynol such as 1-ethynyl-1-cyclohexanol, 2-methyl-3-butyn-2-ol; or polymethylvinylcyclosiloxanes, such as 1,3,5,7-tetravinyltetramethyltetracyclo-siloxane, alkyl maleate. The amount of the inhibitor can be selected according to its chemical structure and the desired curing rate. Generally, the weight of inhibitor in the composition is from 1 to 50,000 ppm, for example from 10 to 10,000 ppm.

Component (F)

In order to obtain a cured foam with good mechanical properties, it is preferred to incorporate reinforcing filler (F) into the foamable silicone composition. Examples of reinforcing filler (F) are calcium carbonate, silica, silica fine powder, diatomaceous earth, organic montmorillonite, titanium dioxide, but are not limited thereto. And silica is particularly preferred. The silica includes fumed silica, precipitated silica, and mixtures thereof. The specific surface area of the silica is suitably at least 50 $m^2/g$, preferably in the range from 100 to 400 $m^2/g$ for example 150 to 350 $m^2/g$ as determined by BET method. The silica can either be hydrophilic or hydrophobic.

The reinforcing filler (F) is suitably used in an amount of from 0 wt % to 30 wt %, for example from 5 wt % to 25 wt %, preferably from 15 wt % to 20 wt %, based on the total weight of the composition.

Other Optional Components

The foamable silicone composition can further comprise an appropriate amount of additives, as long as such additives do not impair the effects of the present invention. Examples of such additives are compression set assistants (G), halogen-free flame retardants (H), diluents (I), thixotropic agents (J), pigments (K), but are not limited thereto.

Examples of the compression set assistants (G) to be mentioned are organic sulfur compounds, including mercaptans for example alkylthiols, arylthiols, mercaptoheterocycles such as mercaptoimidazoles and mercaptobenzimidazoles, silanes with sulfur-containing functional groups for example mercaptoalkylalkylalkoxysilane, bis(trialkoxysilylalkyl) mono-, di- or polysulfane, thiocyanatoalkyltrialkoxysilane, and thiofunctional siloxanes for example a polydimethylsiloxane-co-mercaptoalkyl compound. Preferences are given to 3-mercaptopropyltrimethoxysilane, 3-mercaptopropyltriethoxysilane, a polydimethylsiloxane-co-mercaptoalkyl compound.

The organic sulfur compound of the present disclosure may be used alone, or may be applied, reacted or blended onto the filler. In an embodiment herein, fumed silica onto which 3-mercaptopropyltrimethoxysilane or 3-mercaptopropyltriethoxysilane has been applied, reacted or blended is used as the compression set assistant. The organic sulfur compound of the present disclosure is used suitably in an amount of less than 2 wt %, for example less than 1 wt %, based on the total weight of the composition. In an embodiment herein, the organic sulfur compound accounts for from 0.2 wt % to 0.8 wt % of the total weight of the composition.

Examples of the halogen-free flame retardants (H) are aluminum-magnesium-based flame retardants such as aluminum hydroxide and magnesium hydroxide, phosphorus-based flame retardants such as ammonium polyphosphate, diammonium hydrogen phosphate, disodium hydrogen phosphate, sodium phosphate, magnesium phosphate, red phosphorus, tributyl phosphate, tris(2-ethylhexyl) phosphate, cresyl diphenyl phosphate, tricresyl phosphate, triphenyl phosphate and (2-ethylhexyl) phosphate-diphenyl ester, nitrogen-based flame retardants such as melamine and its derivatives, triazine and its derivatives, carbon-based flame retardants such as carbon black, expandable graphite, expanded graphite, carbon nanotubes, fullerene and graphene, silicone-based flame retardants such as polydimethylsiloxane, polysilsesquioxane and silicone resins, boron-based flame retardants such as zinc borate, but are not limited thereto. Preference is given to the carbon-based flame retardants. In an embodiment herein, the halogen-free flame retardant is expandable graphite, and may not contain any other halogen-free flame retardants.

Component (H) is used in at least an amount of minimum level required to ensure an effective flame retardancy. Generally, the higher the amount of component (H) is, the better the flame retardancy of the silicone foam is. However, in order not to significantly affect the homogeneity of the silicone foam, Component (H) is preferably used in an amount of less than 20 wt %, for example less than 15 wt %, more preferably less than 10 wt %, based on the total weight of the composition. In an embodiment herein, the halogen-free flame retardant is a carbon-based flame retardant that accounts for from 5 wt % to 15 wt % of the total weight of the composition. In a more specific embodiment herein, the halogen-free flame retardant is expandable graphite that accounts for from 5 wt % to 10 wt %, for example from 5 wt % to 8 wt %, of the total weight of the composition. The halogen-free flame retardant preferably has a sieve particle size of from 80 to 200 μm, for example from 80 to 150 μm, or from 80 to 120 μm. Surprisingly, the halogen-free flame retardant having a particle size within the above range can significantly reduce the amount of flame retardant added.

Examples of diluents (I) to be mentioned are dimethyl silicone oils having a dynamic viscosity of from 10 to 5,000 mPa·s at 25° C., MDT silicone oils having a dynamic viscosity of from 15 to 300 mPa·s at 25° C., mineral oils having a kinematic viscosity of from 10 to 100 $mm^2/s$ at 25° C. Generally, the addition of diluents could lower the viscosity of the composition and change the rheological properties thereof. Nevertheless, in view of the potential bleeding issue, the foamable silicone composition of the present disclosure can be free of diluents.

Examples of thixotropic agents (J) to be mentioned are polyethers such as polyethylene oxide, polypropylene oxide, copolymers of ethylene oxide and propylene oxide, and polyether-modified silicones such as DC 193 supplied by Dow Corning, TEGOPREN 3022, TEGOPREN 3070, TEGOPREN 5878, TEGOPREN 5847 supplied by Evonik Industries.

The foamable silicone composition of the present disclosure can be stored as two separate packages where Component (B) and (C) are not stored in the same package and Component (A), (B) and (D) are not stored in the same package.

The composition of the present disclosure, or each separate package as mentioned above has a viscosity suitably of from 50,000 to 500,000 mPa·s, for example from 100,000 to 300,000 mPa·s. Generally, the higher the viscosity of the composition is, the lower density of the obtained foam tends to be. The composition of the present disclosure with a high viscosity cures to form a medium-density foam, taking into account both foam density and mechanical properties.

The second aspect of the present disclosure provides a foam formed from the foamable silicone composition of the first aspect of the present disclosure.

It is obtained by crosslinking or curing the composition described in the first aspect of the present disclosure, or mixing the separate packages as described above followed by crosslinking or curing.

Generally, the crosslinking or curing is carried out at a temperature of 15-180° C. for 10 minutes-72 hours. A lower curing temperature and a short curing time are desired. Considering that the curing and foaming reactions occur simultaneously and both are very sensitive to temperature, curing at a temperature of 70-150° C. for 15-60 minutes is preferred so as to balance these two reactions and obtain a good cell structure.

The foam of the present disclosure has a density of from 0.4 to 0.6 $g/cm^3$ and a closed cell ratio of greater than 90%. The determination of the foam density is carried out according to the GB/T 6343-2009 standard which is titled Cellular plastics and rubbers—Determination of apparent density. The determination of the closed cell ratio is carried out according to the GB/T 10799-2008 standard which is titled Rigid cellular plastics—Determination of the volume percentage of open cells and of closed cells.

The third aspect of the present disclosure provides use of the foamable silicone composition of the first aspect of the present disclosure for sealing battery pack cases, especially battery pack cases of electric vehicles.

The use comprises dispensing, particularly advantageously via an automatic dispenser, and curing of the composition described in the first aspect of the present disclosure, and afterwards compressing to achieve the sealing between the bottom plate and upper cover of the battery case. If the foam cured from the foamable silicone composition has a hardness that is too high, compression will become difficult and the upper cover of the case is likely to deform, causing difficulties in processing and sealing.

The present invention is further illustrated by the following examples, but is not limited to the scope thereof. Any experimental methods with no conditions specified in the following examples are selected according to the conventional methods and conditions, or product specifications.

Compression Set Under High Temperature Condition

It is carried out according to Method C in Section 7 of the GB/T 6669-2008 standard which is titled Flexible cellular polymeric materials. —Determination of compression set. Results are expressed in CS (%) (compression amount/%, compression time/hour, compression temperature/° C.), which is calculated by the formula as follows.

$$CS=(d_0-d_r)/d_0\times 100\%$$

wherein CS is compression set value, expressed in percentage (%);

$d_0$ is the initial thickness of the sample, in mm; and $d_r$ is the final thickness of the sample, in mm.

The value of CS varies with test conditions. Generally, the smaller the compression amount, the shorter the compression time and the lower the compression temperature, the lower the CS value. CS (%) (50%, 22 h, 70° C.) is typically used to determine the compression set of flexible foam polymeric materials. However, a low CS value measured under such test condition does not mean the corresponding foam material is suitable for the sealing of battery pack cases with high sealing levels since the CS value measured at a temperature of 100° C. may obviously be greater, or even significantly greater than that measured at 70° C. A foam material with a low CS value at a high temperature, for example 110° C., is desired for sealing of battery pack cases due to the ease of heat accumulation inside the battery, therefore the present invention uses CS (%) (50%, 22 h, 110° C.) to evaluate the compression set of foam under high temperature conditions.

Compression Set Under High Temperature and Humidity Condition

The requirements of device, measuring tool and samples conform to the GB/T 6669-2008 standard, and the test process is as follows. Samples to be tested are adjusted at a temperature of (23±2)° C. and a relative humidity of 50%±5% for 16 hours, then are placed between two plates of the device and compressed to a thickness of 50% of their initial thickness, which is measured according to the GB/T 6342 standard, then within 15 minutes these samples are placed, without changing their shape, in an oven with constant temperature 85° C. and relative humidity 85% for 1000 hours, during which on the 7th, 14th, 28th and 42th day samples are taken out of the oven and subjected to a temperature of (23±2)° C. and a relative humidity of 50%±5% to recover for 2 hours followed by measuring thickness, and CS values are calculated according to the aforesaid formula, and results are expressed as $CS_{D85}$(%) (compression amount/%, compression time/day).

Compression Set Under Thermo-Shock Condition

The requirements of device, measuring tool and samples conform to the GB/T 6669-2008 standard, and the test process is as follows. Samples to be tested are adjusted at a temperature of (23±2)° C. and a relative humidity of 50%±5% for 16 hours, then are placed between two plates of the device and compressed to a thickness of 50% of their initial thickness, which is measured according to the GB/T 6342 standard, then within 15 minutes these samples are placed, without changing their shape, in a thermal shock box running 1000 cycles of −40° C. (30 minutes)~85° C. (30 minutes), during which on the 7th, 14th, 28th and 42th day samples are taken out of the oven and subjected to a temperature of (23±2)° C. and a relative humidity of 50%±5% to recover for 2 hours followed by measuring thickness, and CS values are calculated according to the aforesaid formula, and results are expressed as $CS_{shock}$ (%) (compression amount/%, compression time/d).

Determination of Hardness

LX-C microporous material hardness tester is used for measurement. Sample size: thickness 10±0.5 mm, width ≥30 mm, length ≥60 mm.

Determination of Tensile Strength and Elongation at Break

It is carried out according to the GB/T 6344-2008 standard which is titled Flexible cellular polymeric materials—Determination of tensile strength and elongation at break.

Test of Flame Retardancy

It is carried out according to the UL 94V standard using samples with a size of length 120 mm×width 13 mm×thickness 2 mm.

Results are rated according to the following grades.

V-0: the maximum after flame time of less than 10 seconds, no drips of flaming material (excellent flame retardancy)

V-1: the maximum after flame time of less than 30 seconds, no drips of flaming material (good flame retardancy)

V-2: the maximum after flame time of less than 30 seconds, with drips of flaming material (general flame retardancy)

N.C.: non classified (poor flame retardancy).

Details of the raw materials used in the Examples and Comparative Examples are as follows.

A1: dimethylvinylsiloxy-terminated polydimethylsiloxane, with a dynamic viscosity of about 20,000 mPa·s at 25° C., supplied by Wacker Chemicals.

A2: dimethylvinylsiloxy-terminated polydimethylsiloxane, with a dynamic viscosity of about 190 mPa·s at 20° C. according to DIN 53019, supplied by Wacker Chemicals.

B: hydrogen-containing polydimethylsiloxane, with a hydrogen content of 1.63 wt %, supplied by Wacker Chemicals.

C1: water-based emulsion of polydimethylsiloxane, with a dynamic viscosity of 5,000-10,000 mPa·s at 25° C. and a hydroxyl content of 59.9 wt %, supplied by Wacker Chemicals.

C2: dimethylhydroxylsiloxy-terminated polydimethylsiloxane, with a hydroxyl content of 1.2 wt %, supplied by Wacker Chemicals.

D: platinum-based catalyst, WACKER® CATALYST EP, supplied by Wacker Chemicals.

E: inhibitor, WACKER® INHIBITOR PT 88, supplied by Wacker Chemicals.

F: fumed silica, with a BET surface area of 150-350 $m^2/g$, supplied by Wacker Chemicals.

G: compression set assistant, prepared by the below process.

1) 10 grams of water were mixed, at room temperature and atmospheric pressure and with stirring, into 100 grams of Component F followed by adding 12.24 grams of 3-mercaptopropyltrimethoxysilane, both in finely divided form, into the mixture. This was followed by annealing at 80° C. for 1 hour and removal of reaction by-products under reduced pressure to give 106.1 grams of a white powder.

2) 43.3 parts by weight of Component A1 were mixed in a kneader with 20 parts by weight of Component F, and processed to give a homogeneous composition. Then 10 parts by weight of the white powder obtained by the above step were added to this composition, followed by homogenization at 120° C. for an additional 0.5 hours. Finally, 26.7 parts by weight of Component A1 were incorporated to give 93.3 grams of compression set assistant.

H1: expandable graphite, with a sieve particle size of 100 μm.

H2: expandable graphite, with a sieve particle size of 75 μm.

Examples 1-8 and Comparative Examples 1-2

According to the formulas in Table 1, the ingredients in each Component A and Component B were mixed well respectively. Then Component A and B were mixed at a ratio of 1:1 and cured at 80° C. for 0.5 hours to give a silicone foam.

Table 2 lists the test results of the foams obtained in each Example and Comparative Example regarding density, compression set and hardness. It can be seen from Table 2 that the foams obtained in Examples 1-8 have a CS (50%, 22 h, 110° C.) of less than or equal to 10%, displaying an excellent resilience performance, and a moderate hardness, which is very conducive to the sealing of battery pack cases. The Si—H/OH molar ratio of the foamable composition in Comparative Example 1 is too low, leading to a significantly increased CS of the resulting foam, which is not conducive to the sealing effect. The Si—H/Si—Vi molar ratio of the foamable composition in Comparative Example 2 is too high, leading to an obviously increased CS of the resulting foam as well and a high foam hardness, which is likely to cause sealing failure of battery pack cases.

Table 3 shows the compression set of the foam obtained in Example 4, under either high temperature and humidity or thermal shock, is less than or equal to 10%, indicating a good aging resistance, which is also suitable for the sealing of battery pack cases with high sealing levels. Table 4 shows the foam obtained in Example 1 has excellent mechanical properties, and incorporating a certain amount of expandable graphite into its formula does not reduce the foam mechanical properties.

Table 5 shows the foamable composition in Example 4 comprising a certain amount of expandable graphite H1 such that it achieves excellent flame retardancy of V-0 grade, to be noted that such flame retardancy is not achieved at the cost of an increased foam CS and hardness. The foamable compositions in Examples 5-6 comprising a certain amount of expandable graphite H2 have poor flame retardancy of N.C. grade.

TABLE 1

| | Ingredients (parts by weight) | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Component A | A1 | 76.42 | 76.42 | 76.42 | 76.42 | 76.42 | 76.42 | 76.08 | 77.44 | 73.78 | 73.64 |
| | A2 | 2.26 | 2.26 | 2.26 | 2.26 | 2.26 | 2.26 | 2.25 | 2.29 | 2.24 | / |
| | C1 | 0.17 | 0.17 | 0.17 | 0.17 | 0.17 | 0.17 | 0.59 | 0.57 | 5.55 | 0.20 |
| | C2 | / | / | / | / | / | / | / | / | / | / |
| | D | 0.39 | 0.39 | 0.39 | 0.39 | 0.39 | 0.39 | 0.36 | 0.34 | 0.32 | 0.39 |
| | F | 20.77 | 20.77 | 20.77 | 20.77 | 20.77 | 20.77 | 20.72 | 19.36 | 18.11 | 20.77 |
| | sum | 100.01 | 100.01 | 100.01 | 100.01 | 100.01 | 100.01 | 100.00 | 100.00 | 100.00 | 95.00 |
| Component B | A1 | 62.03 | 62.03 | 62.03 | 62.03 | 62.03 | 62.03 | 62.01 | 63.21 | 63.35 | 58.45 |
| | A2 | 2.26 | 2.26 | 2.26 | 2.26 | 2.26 | 2.26 | 2.25 | 2.29 | 2.23 | / |
| | B | 4.57 | 4.57 | 4.57 | 4.57 | 4.57 | 4.57 | 4.52 | 4.58 | 4.47 | 5.38 |
| | E | 0.21 | 0.21 | 0.21 | 0.21 | 0.21 | 0.21 | 0.23 | 0.21 | 0.21 | 0.21 |
| | F | 14.36 | 14.36 | 14.36 | 14.37 | 14.36 | 14.36 | 14.38 | 12.95 | 13.40 | 14.37 |
| | G | 4.46 | 4.46 | 4.46 | 4.46 | 4.46 | 4.46 | 4.43 | 4.50 | 4.39 | 4.46 |
| | H1 | / | 6.00 | 8.00 | 11.15 | / | / | 11.10 | 11.30 | 11.03 | 11.15 |
| | H2 | / | / | / | / | 8.00 | 10.00 | / | / | / | / |
| | sum | 87.89 | 93.89 | 95.89 | 99.08 | 95.89 | 97.89 | 98.92 | 99.04 | 99.08 | 94.02 |
| Si—H/Si—Vi* (molar ratio) | | 10.47 | 10.47 | 10.47 | 10.47 | 10.47 | 10.47 | 10.39 | 10.34 | 10.35 | 15.42 |
| Si—H/OH (molar ratio) | | 12.44 | 12.44 | 12.44 | 12.44 | 12.44 | 12.44 | 3.54 | 3.72 | 0.37 | 12.45 |

*:Number of moles of Si—Vi is calculated based on the Si—Vi groups in Ingredient A1, A2 and G.

TABLE 2

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Foam Density (g/cm$^3$) | 0.45-0.55 | 0.45-0.55 | 0.45-0.55 | 0.45-0.55 | 0.45-0.55 | 0.45-0.55 | 0.45-0.55 | 0.45-0.55 | NT* | NT |
| CS (%) (50%, 22 h, 110° C.) | 6 | 7 | 7 | 9 | 7.5 | 9 | 10 | 9 | 32 | 24 |
| Hardness | 35 | 36 | 36 | 37 | NT | NT | 32 | 29 | 11.5 | 36 |

*: Not Tested.

TABLE 3

| Compression Set under high temperature and humidity or thermal shock | | Example 4 |
|---|---|---|
| $CS_{D85}$ (%) (50%) | 7 d | 6.5 |
| | 14 d | 5.5 |
| | 28 d | 7 |
| | 42 d | 8.5 |
| $CS_{shock}$ (%) (50%) | 7 d | 4 |
| | 14 d | 4 |

TABLE 3-continued

| Compression Set under high temperature and humidity or thermal shock | | Example 4 |
|---|---|---|
| | 28 d | 6 |
| | 42 d | 8 |

TABLE 4

| | Example 1 | Example 4 |
|---|---|---|
| Tensile Strength (Mpa) | 0.91 | 0.73 |
| Elongation at Break (%) | 170 | 140 |

TABLE 5

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Flame Retardancy (grade) | N.C. | N.C. | V-1 | V-0 | N.C. | N.C. | V-0 | V-0 | V-0 | V-0 |

The invention claimed is:

1. A foamable silicone composition comprising the following components:

(A) at least one organopolysiloxane containing at least two alkenyl groups bonded to silicon, per molecule;

(B) at least one organopolysiloxane containing at least two hydrogen atoms bonded to silicon, per molecule;

(C) at least one hydroxy group-containing porogenic agent to generate gaseous hydrogen in the presence of component (B);

(D) at least one hydrosilylation catalyst; and (E) a halogen-free graphite flame retardant having a sieve particle size of 80 to 150 μm, the halogen-free graphite flame retardant being present in an amount of 5 wt % to 15 wt % based on the total weight of the foamable silicone composition;

wherein the molar ratio of SiH groups from component (B) to silicon-bonded alkenyl groups from component (A) is from 5:1 to 15:1; the molar ratio of SiH groups from component (B) to hydroxy groups from component (C) is 2:1 to 20:1; and the foamable silicone composition is curable to form a foam having a density of 0.4 to 0.6 g/$cm^3$.

2. The composition of claim 1, wherein the molar ratio of SiH groups from component (B) to hydroxy groups from component (C) is from 3.5:1 to 12.5:1.

3. The composition of claim 1, wherein the molar ratio of SiH groups from component (B) to silicon-bonded alkenyl groups from component (A) is from 7:1 to 12:1.

4. The composition of claim 1, wherein component (B) has a hydrogen content of from 1.2 wt % to 1.7 wt %.

5. The composition of claim 1, wherein component (A) comprises (A1) a first organopolysiloxane containing at least two alkenyl groups bonded to silicon per molecule with a dynamic viscosity of from 1,000 to 100,000 mPa·s at 25° C., and (A2) a second organopolysiloxane containing at least two alkenyl groups bonded to silicon per molecule with a dynamic viscosity of from 10 to 1,000 mPa·s at 25° C.

6. The composition of claim 1, wherein the at least one hydroxy group-containing porogenic agent (C) comprises water.

7. The composition of claim 1, further comprising (F) at least one inhibitor.

8. The composition of claim 7, further comprising (G) at least one reinforcing filler.

9. The composition of claim 8, wherein the at least one reinforcing filler (G) comprises fumed silica.

10. The composition of claim 8, further comprising (H) an organic sulfur compound.

11. The composition of claim 1, wherein the composition has a dynamic viscosity from 100,000 to 300,000 mPa·s at 25° C.

12. The composition of claim 1, wherein the halogen-free graphite flame retardant comprises expandable graphite.

13. The composition of claim 1, wherein the molar ratio of SiH groups from component (B) to hydroxy groups from component (C) is from 3.5:1 to 12.5:1 and the molar ratio of SiH groups from component (B) to silicon-bonded alkenyl groups from component (A) is from 7:1 to 12:1.

14. The composition of claim 5, wherein the component (A2) is present in an amount from 0.2 wt % to 10 wt % based on the total weight of component (A).

15. A foam formed from curing the composition of claim 1.

16. A battery pack case sealed with the foam of claim 15.

17. The composition of claim 1, wherein the foam has a density of 0.45-0.55 g/$cm^3$.

18. A foamable silicone composition comprising the following components:

(A) at least one organopolysiloxane containing at least two alkenyl groups bonded to silicon, per molecule;

(B) at least one organopolysiloxane containing at least two hydrogen atoms bonded to silicon, per molecule;

(C) at least one hydroxy group-containing porogenic agent to generate gaseous hydrogen in the presence of component (B);

(D) at least one hydrosilylation catalyst; and (E) a halogen-free graphite flame retardant having a sieve particle size of 80 to 150 μm, the halogen-free graphite flame retardant being present in an amount of 5 wt % to 15 wt % based on the total weight of the foamable silicone composition;

wherein the molar ratio of SiH groups from component (B) to silicon-bonded alkenyl groups from component (A) is from 5:1 to 15:1; the molar ratio of SiH groups from component (B) to hydroxy groups from component (C) is 2:1 to 20:1; and the foamable silicone composition has a viscosity of 100,000 to 300,000 mPa·s.

19. The composition of claim 18, wherein the foamable silicon composition is curable to form a foam having a density of 0.4 to 0.6 g/$cm^3$.

20. The composition of claim 19, wherein the foam has a density of 0.45-0.55 g/$cm^3$.

* * * * *